Sheet 1. 3 Sheets.
Hill, Hebard & Rockwell.
Ticket Printing Press.
No. 1279. Reissued Feb. 25. 1862.
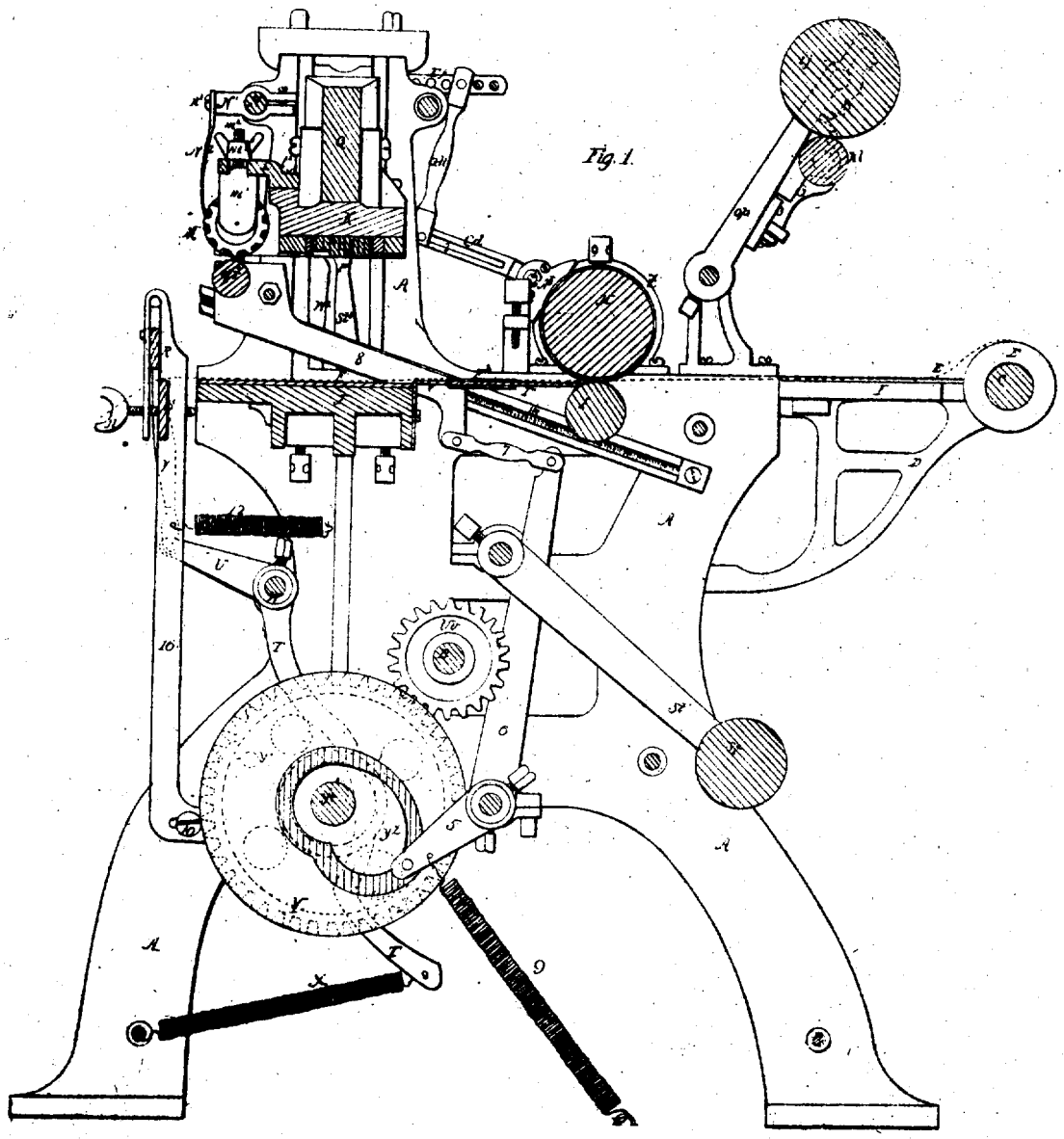
Witnesses:
E. B. Torbush,
Wm H. Mealy.
Inventor
Sanford, Hanson & Co.

Sheet 2. 3 Sheets
Hill, Hebard & Rockwell
Ticket Printing Press.
No. 1279 Reissued Feb. 25. 1862
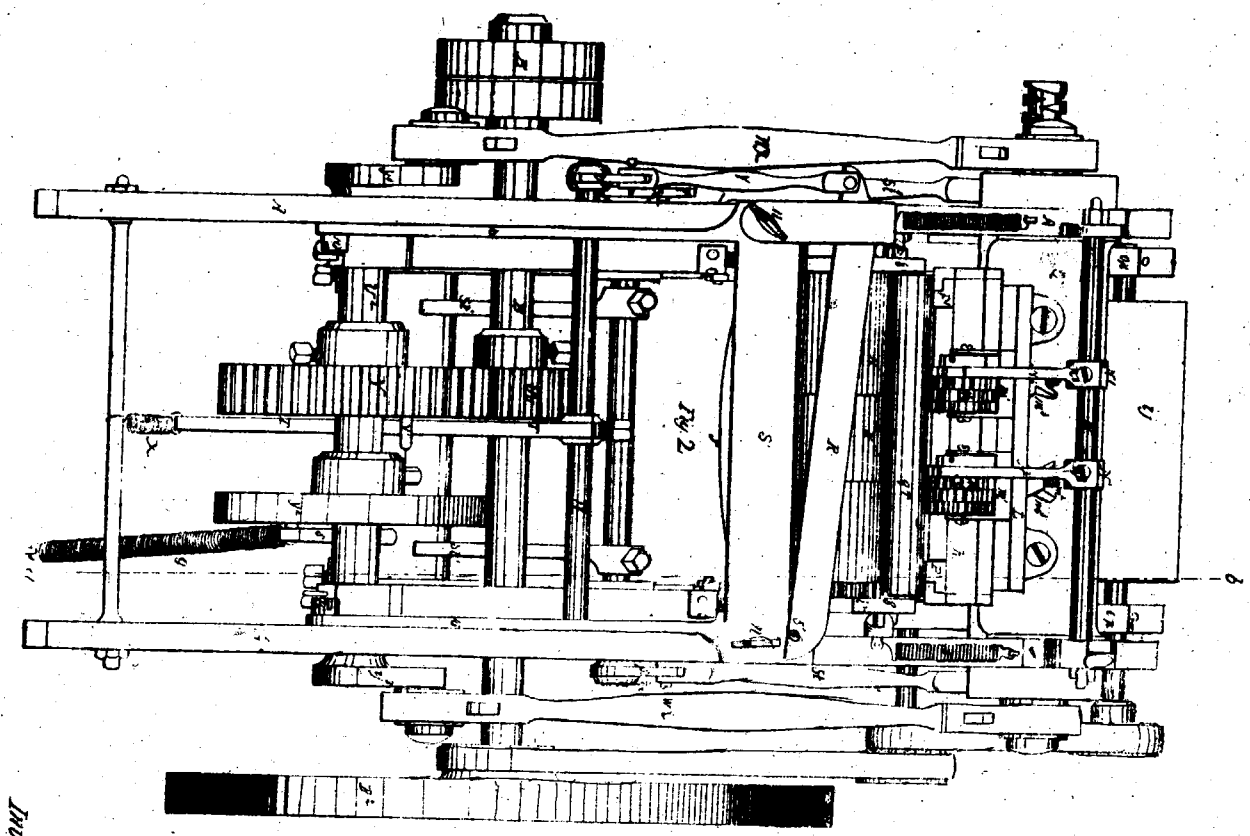
Witnesses:
E. B. Forbush
Wm Mealy
Inventor:
Sanford Harrow & Co

Hill, Hebard & Rockwell.
Ticket Printing Press.
No. 1279. Reissued Feb. 25. 1862
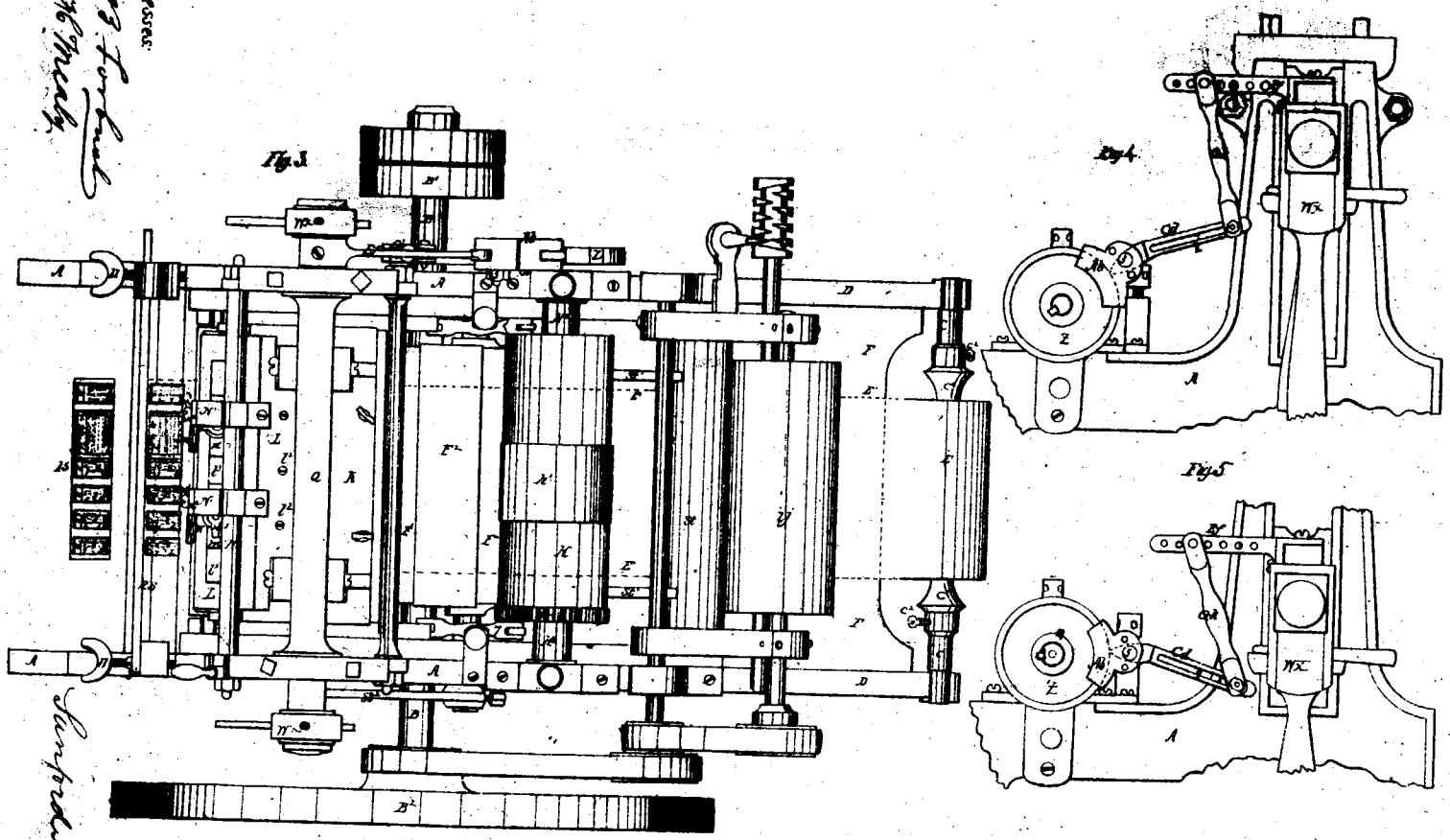
Witnesses:
C. B. Forbush
C. H. Mealy
Inventor
Sanford Harrington

UNITED STATES PATENT OFFICE.

SANFORD, HARROUN & CO., OF BUFFALO, NEW YORK, ASSIGNEES, BY MESNE ASSIGNMENTS, OF GEO. F. HEBARD, GEORGE J. HILL, AND S. D. ROCKWELL.

PRINTING-PRESS.

Specification forming part of Letters Patent No. 29,547, dated August 7, 1860; Reissue No. 1,279, dated February 25, 1862.

*To all whom it may concern:*

Be it known that GEORGE J. HILL, GEORGE F. HEBARD, and SIMON D. ROCKWELL, of the city of Buffalo and State of New York, (assignors to SANFORD, HARROUN & Co., of the city of Buffalo, aforesaid, printers,) heretofore invented certain new and useful Improvements in Printing-Presses for Printing and Numbering Railroad Coupon-Tickets. Now, therefore, we JAMES H. SANFORD, GILBERT K. HARROUN, and WARREN BRYANT, composing the firm of SANFORD, HARROUN & Co., assignees, as aforesaid, by virtue of the statute in such case made and provided, do hereby declare that the following is a full, clear, and exact description of the said invention and improvements, reference being had to the accompanying drawings, making a part of this specification, in which—

Figure I is a vertical section of the said improved, printing and numbering press, taken on line *a b* of Fig. II. Fig. II is an end elevation. Fig. III is a top plan; Fig. IV and V elevations to represent the intermittent feed in the extremes of its movements.

The nature of the said invention relates, first, to printing and numbering railroad coupon-tickets consecutively from a long sheet or continuous roll of printing-paper or thin card-board, which may be wound into a roll, the said paper or card-board being delivered from the roll to the printing and numbering mechanism by an intermittent movement of the feed-rollers; second, in the combination and arrangement of a cutting mechanism with a roller or equivalent carrying a roll of paper or card-board, and printing and numbering mechanism, so that coupon-tickets may be printed, numbered, and cut simultaneously either from long sheets or continuous roll of printing-paper or card board, which may be wound into a roll; third, in making the numbering wheels adjustable horizontally, so that the machine can be readily adapted to numbering tickets of different widths; fourth, in an improved construction of the feed-roller, whereby the upper feed-roller is made to bite only upon a portion of the width of the paper.

Letters of like name and kind refer to like parts in each of the figures.

A represents the main supporting framework of the machine; B, driving-shaft; $B'$, driving-pulley; $B^2$, balance-wheel. C represents a shaft or spool used for supporting a roll of paper, and placed in a proper position on the machine for the paper to be delivered to the printing and numbering mechanism. It runs in appropriate journals on the arms D, and may be put in or taken out at pleasure to receive, change, or adjust a roll of paper thereon. Two movable conical thimbles, $c'$, are placed on this shaft, having set-screws, $c^2$, so that the thimbles may be set on the shaft at any required distance apart, and thereby made adaptable to any required width of paper.

E represents a long sheet of printing-paper or thin card-board wound into a cylindrical form or roll and placed upon the shaft or spool C in a manner to be freely delivered to the printing and numbering mechanism. In forming the paper into a roll a sufficient hollow is left longitudinally through the center of the roll to admit the shaft C, so that the roll will be balanced upon the shaft, and so that it will unroll therefrom as it is fed into the printing and numbering mechanism.

When the roll of paper or card-board is put upon the shaft and placed in position, the thimbles $c'$ are moved up to the roll and made fast to the shaft by the set-screws $c^2$, the taper ends of the thimbles slightly entering the central hollow of the roll, so that the roll will be made fast and revolve with the shaft.

Very thin printing-paper may be used, or heavy paper, or thin card-board, which can be wound into a roll, may be used. The machine is adapted by the improvements to either kind required.

F is a table for supporting the paper as it is run off from the roll. $F'$ is a central table for supporting the paper between the feed-rollers and the platen. $F^2$ is a movable and adjustable guide connected with the central table for guiding the paper in a direct line to the printing and numbering mechanism.

H is a feed roller supported upon its journal $H'$, having a raised center, as shown at $h'$. The raised center is made less in width than the width of the paper used, and acts upon the central portions of the paper.

The purpose of this improvement is to make the feed-roller to act upon a portion of the width of the paper, instead of acting upon its whole width, in order to deliver to the printing and numbering mechanism very thin and cheap paper in a smooth and even sheet, which could not be done by the old form of feed-rollers.

The under feed-roller, I, is made straight and smooth in a common manner, and the two feed-rollers are geared together by the gear-wheels $i^2$ and $i^3$.

J represents a stationary platen, upon which he impression is made. This is of common construction.

K is a vertically-moving bed, to which the chase containing the form of the subject-matter of the text-ticket and its coupons is attached. The construction of this bell and its vertical movement in the main frame, and the attachment of the form thereto, is accomplished in a common and well-known manner.

L represents a plate for supporting the numbering-wheels. It is connected to the main frame by the bolts $l^2$. It also has a long slot running lengthwise of the plate, as shown at $l^3$, through which the stem $m^2$, which projects from the frame of the numbering-wheel passes in order to effect a longitudinal adjustment of the numbering-wheels. M represents a numbering-wheel of common and well-known construction, which is hung or supported in a hanger or frame, $m'$, from which frame projects a stem, $m^2$, upon which is cut a screw-thread. This stem passes through the slot $l^3$, and by means of the nut $m^3$ the said frame and wheel are held to the plate at such point as placed, and thereby the numbering-wheels may be moved horizontally and placed in such relative position to each other as may be necessary to number coupon-tickets of different size and widths. Two, three, or more of these numbering-wheels are in this manner arranged side by side and adjusted for numbering the text-ticket and as many checks or coupon attachments of any width or size as may be required.

Numbering-wheels of common and well-known construction and operation are and may be used for this purpose, and in this arrangement and combination, and we will not, therefore, enter into a detailed description of their particular construction, our purpose being merely to represent them in their new combination and arrangement, having reference to what is well known for the details of their construction.

N represents a shaft supported upon the main frame and over the number-wheels, to which shaft are connected the movable boxes $N'$ and spring-pawls $N^2$. The spring-pawls are fastened to the movable boxes by means of the screws $n^3$, and these movable boxes are so placed upon the shaft that the pawl will strike the ratchet-wheel of each number-wheel (there being a pawl for each number-wheel) and move it one notch forward as the number-wheels move up with the bed K and form P. The number-wheels are, by means of the plate L, connected to the bed K, and the form P (including the chase $P'$) is also connected with the bed in a common manner, and the bed is connected to the sliding cross-head Q, so that all these parts have a simultaneous vertical movement. The pawls are stationary, (when placed,) and therefore each upward movement of the number-wheels will bring the ratchet-wheel (which is connected with the unit-wheel) in contact with the pawl and move the ratchet and unit wheels together one notch forward. The unit-wheel actuates the other number-wheels, which occupy, respectively, the place of tens, hundreds, thousands, &c., in a common and well-known manner.

R and S represent a pair of shears for severing the tickets from the roll as fast as printed and numbered, S being the stationary, and R the movable or working blade. The working blade is hinged to the stationery, blade by the bolts $s'$, and is operated through the arrangement of the cam-lever T, crank $r$, and connecting-rod V. The upper end of the cam-lever T is connected to shaft W, and its lower end to the coil-spring X. There is a pin, $Y'$, projecting from the spur-wheel Y, which strikes the cam-lever as the wheel revolves, in a manner to move the working blade downwardly and cut the printed and numbered ticket from the sheet. The coil-spring X gives these parts the opposite movement.

Z represents a wheel made fast to the end of the feed roller shaft $H^2$. A clutch-box, A $b$, plays upon the rim of this wheel, which, in connection with the clutch-lever C $d$, operates upon the wheel in a manner to give an intermittent feed-motion to the feed-rollers H and I.

E $f$ represents an arm, which is made fast to the sliding cross-head Q, and projects therefrom, as shown, and moves up and down with the cross-head. It has several holes 1, and the clutch-lever has a long slot, 2, for the adjustment of the connecting-rod G $h$, so as to give greater or lesser feed, as desired. The clutch-lever is hinged in the clutch-box, as shown at 3. As the sliding cross-head rises, the clutch-lever takes hold of the wheel and turns it through its whole upward movement, and as it descends the clutch releases its hold upon the wheel and slides on the rim to its lowest position for a new hold, without moving the wheel, and thus an intermittent motion is given to the feed, so that each feed-motion will move the paper a distance equal to the length of paper required for a ticket.

$i$ $j$ and $k$ $l$ are inking-rollers supported in the hinged frame $o$ $p$, constructed and operated in a common manner. They are represented in Figs. I, II, and III as raised up by the hinged frame and inclined over the table F in order to show more clearly the parts directly under them when they are let down in their proper place.

*q r* is the distributing inking-roller which carries ink to the type or form and to the number-wheels, and is arranged and operated in a common manner. *s t* is a counter-balance, operating upon the cross head by means of the shaft *s t'*, crank *s t²*, and connecting-rod *s t³*. These parts are of common construction and operation. The counter-balance is shown at its lowest position. *u v*, pinion on main driving-shaft; *y*, large pinion on crank-shaft; *y²*, crank-shaft; *y³*, crank on either end of crank-shaft; *y z*, cam placed on crank-shaft, which, through the crank 5, arm 6, connecting-rod 7, and traverse-frame 8, gives the proper movements to the distributing inking-roller. The traverse-frames 8, which carry the distributing inking-roller, moves in the inclined grooved side pieces 14. 15 represents coil-springs, which support the upper ends of the inclined grooved side pieces, 14, and will allow it to yield sufficiently to insure an easy passage of the inking-roller over the face of the type and number-wheels. 9 represents a coil-spring, which moves these parts in the opposite direction; *w x*, connecting-rods, from the main crank-shaft to the sliding cross-head.

Operation: The paper or thin card-board used for the purpose must be of sufficient width to receive the impression of the text-ticket, and each check or coupon crosswise of the sheet, and hence sheets of different widths will be required for tickets for different lines of travel, where the number and size of the checks or coupons differ. Paper or card-board of the required width being wound into a cylindrical form or roll, is properly placed upon the spool *c*, as before described. The free end of the paper is then run off over the table F, and between the feed-rollers H and I, and over the central table, F', and under the guide *f²*, as shown by the dotted lines E'. The raised center of the upper feed-roller bites upon the central portions of the paper in a manner to insure the delivery of the paper to the printing and numbering mechanism in a smooth and even sheet. The form for the text-ticket and its coupons is properly connected with the bed and the numbering-wheels are properly placed and set for numbering the text-ticket, and each coupon in successive order as desired. The machine being then put into operation, the intermittent feed already described will carry the paper along to the printing and numbering mechanism, and the first impression will print the first ticket and its coupons, the second impression will print the second ticket and its coupons, and at the same time number the first ticket and its coupons. The third impression will print the third ticket and its coupons, and number the second ticket and its coupons, and so on in succession order up to any required number.

NOTE: It should be noticed that when the "form" is locked in the chase, its place may be varied so as to make the space between the form and the number-wheels equal to the space required for two or three tickets, in which case the third or fourth ticket would be printed at the impression which numbers the first, and so on; but the principle would be the same—viz., the printing of one ticket and its coupons simultaneously with the numbering of another ticket and its coupons and done at one and the same impression, (always excepting the first and last one or two or three on the end of the sheet or roll.) The intermittent feed will move the paper a distance equal to the amount of paper required for each ticket and its coupons, and the shears are set at the proper distance in advance of the number-wheels to sever the tickets from the sheet as fast as numbered.

It will also be noticed that by means of a slot made in the foot of the standards 16, which support the shears and the screw-bolt, as shown at 10, and by the adjusting-screws 11 and coil-spring 12, the shears may be adjusted to the size or width of the tickets being printed, so that simultaneously with the impression which prints and numbers the shears will cut from the sheet the ticket and coupons numbered at the previous impression, which tickets will fall into a pile in successive order, as shown at 13.

Having now stated and described the principle and operation of the said invention and improvements, what we claim as new, and desire to secure by Letters Patent, is—

1. The combination of the spool or roller *c*, (or the equivalent thereof,) which carries a roll of printing-paper, (or thin card-board, which may be wound into a roll,) with feeding-rollers which have an intermittent feed movement, and the printing and numbering mechanism of a printing and numbering machine, substantially as herein described, so that the paper or card-board may be run off from the roller and fed in by an intermittent movement of the feed-rollers, and properly presented for printing and numbering coupon tickets from a continuous sheet of printing-paper or card-board, substantially as set forth.

2. The combination and arrangement of the cutting mechanism with a roller (or equivalent) carrying a roll of paper or card-board, and the printing and numbering mechanism of a printing and numbering machine, so that coupon and other tickets may be printed, numbered, and cut simultaneously from such printing-paper or card-board, substantially as described.

3. In a machine for printing and numbering coupon-tickets, in combination with the printing mechanism for printing the tickets, making the numbering-wheels adjustable horizontally, substantially as described, whereby the machine can be readily adapted to numbering tickets of different widths.

4. In a machine for printing tickets from a roll or continuous sheet of printing-paper, (or thin card-board,) making the feed-roller so as to act upon a portion of the width of the sheet instead of the whole width, whereby we are enabled to feed in thin sheets of printing-paper or thin card-board in a smooth and even manner.

SANFORD, HARROUN & CO.

Witnesses:

MILO STEVENS,

E. B. FORBUSH.